United States Patent [19]
Suovaniemi

[11] 3,810,391
[45] May 14, 1974

[54] ADJUSTABLE PIPETTE

[76] Inventor: Osmo A. Suovaniemi, Makitorpantie 7 B 18, Helsinki 62, Finland

[22] Filed: June 19, 1972

[21] Appl. No.: 264,164

[52] U.S. Cl. .............................. 73/425.6, 222/309
[51] Int. Cl. ............................................. B01l 3/02
[58] Field of Search .................. 73/425.6; 222/309

[56] References Cited
UNITED STATES PATENTS
3,494,201    2/1970    Roach .............................. 73/425.6
3,498,135    3/1970    Seitz ................................. 73/425.6
3,646,817    3/1972    Hinchman ........................ 73/425.6

Primary Examiner—S. Clement Swisher
Attorney, Agent, or Firm—Sandoe, Hopgood & Calimafde

[57] ABSTRACT

A pipette includes a piston, the movement of which is limited by a regulating member. A scale indicates by the position of the regulating member relative to the body of the pipette the volume of liquid drawn into a container by the movement of the piston. The scale is readable through a transparent member in the body of the pipette.

4 Claims, 3 Drawing Figures

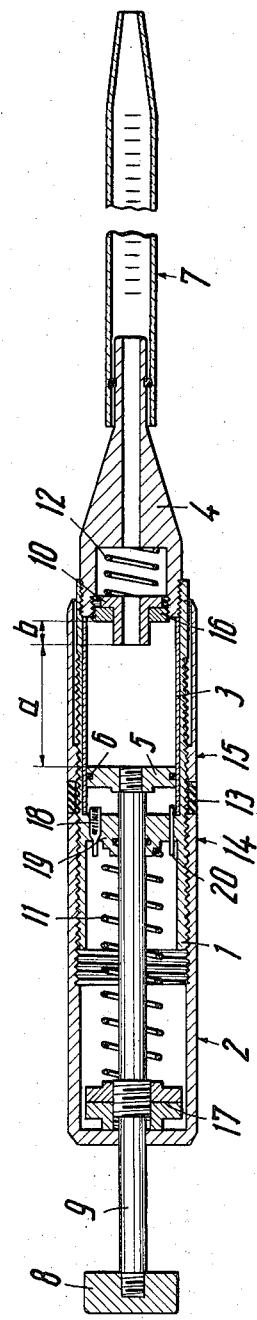
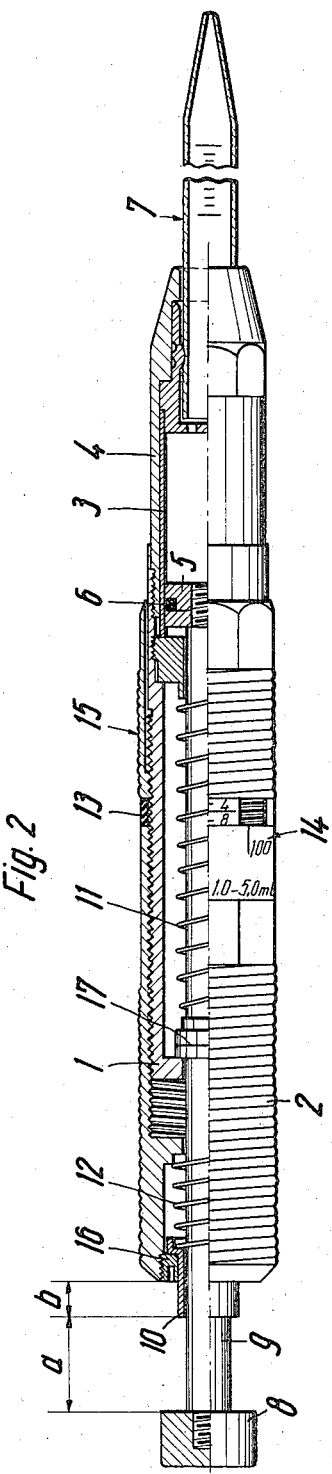
Fig.1
Fig.2

ADJUSTABLE PIPETTE

BACKGROUND OF THE INVENTION

Object of this invention is to provide a pipette comprising a piston slidably journaled within a cylinder and a piston rod connected to the piston. The rod is provided at its upper end with a push button and surrounded by a spiral spring, which returns the pressed-down piston to its original position to suck liquid into a container connected to the lower end of the cylinder. The pipette is further provided with a pointed connecting member against which the piston again can be pressed downwards for emptying the liquid from the container.

The pipette according to the invention is characterized by its regulating mechanism, from which any pipettable volume within the working range of the pipette can be read. It includes a scale cooperating with the body and a regulating member calibrated for a given liquid, e.g. water. A transparent ring is provided through which the scale can be read. The regulating cylinder can be locked to a position corresponding to the desired volume of pipetting with the aid of a locking sleeve. The desired pipetted volume of liquid can be further regulated if necessary with a mechanism adjusting the pipette according to a container which is also provided with a scale. If the specific weight or other properties of the liquid being pipetted deviate from those of the liquid used for calibrating it can thus be compensated for.

Therefore the object of the invention is a pipette suited for liquid dosing, which is linearly and non-discretely adjustable for different volumes. The liquid volume to be pipetted is read directly from a micrometer screw scale that is part of the pipette construction. This scale can be calibrated for a given liquid such as water.

BRIEF DESCRIPTION OF THE DRAWINGS

An exemplary pipette according to the invention is explained further in the specification to follow and in the enclosed dravings, wherein FIG. 1 presents a section taken axially along a pipette according to the invention; and FIGS. 2 and 3 present pipettes according to the invention differing from the pipette of FIG. 1 in regard to location and shape of the components, in which corresponding components have the same numbers.

DESCRIPTION OF THE PREFERRED EMBODIMENT

Figure 3:
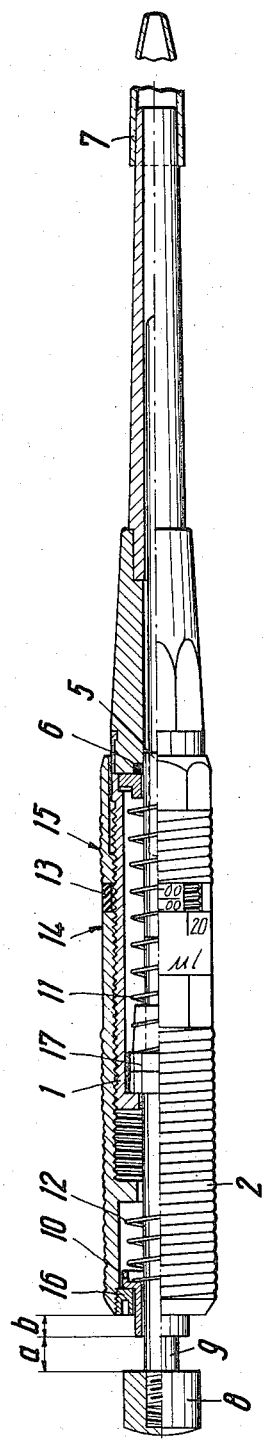

The construction of a pipette according to the invention comprises a body 1 with a thread on the outside, into which the inner thread of a regulating cylinder 2 in fitted. Inside of the body a cylindrical tube 3 is situated with a piston 5 moveable inside thereof. The cylindrical tube 3 and the piston 5 are sealed mutually by a O-ring 6. The cylindrical tube 3 is extended by a pointed connecting member 4 into the container 7 of the pipette which has a predetermined volume.

On pressing the button 8, the movement is transmitted by means of the piston rod 9 to the piston 5. In pipetting the piston 5 is pressed by the button 8 downward a distance "a" in such a way, that the gliding sleeve 10 does not move. The container 7 of the pipette is placed below the surface of the liquid to be pipetted, upon which the button 8 and at the same time the piston 5 are alowed to rise the present distance "a" to their original positions under the force of the spring 11. The piston 5 has then sucked a given volume of liquid into the container 7 of the pipette.

The container 7 of the pipette is emptied by pressing the button 8 as far as to the gliding sleeve 10, and by continuing to press so that the gliding sleeve 10 presses down against the force of the torsion spring 12, so that the button 8 and also the piston 5 move an additional distance "b." By using the distance "a + b" for emptying the pipette container 7 which is longer than the distance "a" used for filling it, complete emptying of the pipette container is ensured.

In calibrating the micrometer screw scale when assembling the pipette, represented by the axial scale of the body 1 and the scale ring or scale at the lower edge 14 of the regulating cylinder 2 in combination, a scale ring is used which can be fastened at the desired position on the regulating cylinder 2. The sliding sleeve 10 adjusted by the screw sleeve 16 or the adjusting nut 17 may also be used as adjusting means, so that the distance "a" will correspond to a given liquid volume on the scale sucked into the pipette container by the piston. In adjusting the pipette for different volumes the regualating cylinder of the pipette is turned either clockwise or counterclockwise, so that the stroke lenth of the piston changes and the desired volume to be pipetted can be directly read from the scale at the lower edge 14 of the regulating cylinder 2 and the scale of the body 1 visible through the transparent ring 13. The transparent ring 13 moves with a small axial play on the body 1. The regulating cylinder 2 is locked by means of the transparent ring 13 to the desired volume by the locking sleeve 15 provided with an inner thread fitting into the outer thread of the body 1.

Filling of the pipette container without spattering is made possible by the following construction according to the invention.

When the piston 5 is pushed down by the button 8 a large-caliber closing valve 18 fitted into the body 1 above the piston opens and air flows through it and a small-caliber valve 20 in the fitting piece 19 into the cylinder 3 portion above the piston 5. When the piston 5 rises due to the force of the spring 11 the closing valve 18 closes, and the air is permitted to flow from the cylinder 3 portion above the piston through the small-caliber valve 20 only, so that the upward movement of the piston 5 is retarded, and consequently the pressure reduction in the portion of the cylinder 3 below the piston 5 and in the container 7 is retarded, at which the liquid flow through the point of the container also is retarded, with the result that the container 7 is filled evenly and without spattering. In connection to the piston it is possible to use for instance, a hydraulic stroke damper. In practice the valve 20 is often sufficient in braking the upward movement of the piston, as in pipetting the piston is kept for some time in the lower position, during which the pressure in the upper part of the cylinder above the piston has adequate time to reach a balance with the outer atmosphere through the valve 20.

In liquid volumes of different sizes are to be pipetted using the same pipette, it can be adjusted rapidly linearly and non-discretely. For instance, between 5 − 5000 $\mu l$ any volume can be pipetted with four different pipettes, with surface ranges e.g. between 5 −50, 50−

1000, and 1000– 5000 μl. Naturally, pipettes can be made according to the invention for pipetting liquid volumes deviating from the range 5– 5000 μl, with working range limits deviating from the examples presented above and with different shape and location of components.

The above described embodiments are merely exemplary and numerous variations and modifications within the scope of the invention will occur to those skilled in the art.

I claim:

1. A pipette comprising a cylinder, piston means moveably journaled within the cylinder, a body holding the cylinder, a piston rod connected to the piston means, a push button connected to the opposite end of the piston rod, spring means for biasing the piston means toward a predetermined position, a container connected to the cylinder and in communication with the interior thereof whereby the container can be filled and emptied by movement of the piston means, a regulating member moveable with respect to said body for limiting the movement of the piston, means for locking the regulating means in a selected position, a scale by which the relative position of the body and regulating member are indicated, and a transparent member through which said scale can be read.

2. The pipette of claim 1, further comprising means for limiting the movement of the piston when filling the container to a lesser distance than that moved when emptying the container.

3. The pipette of claim 1, further comprising means for limiting the rate at which the pipette is filled whereby splattering is prevented.

4. The pipette of claim 1, further comprising means for limiting the rate at which the pipette is filled including small valve means open when the pipette is filled and when it is emptied, and large valve means open only when the pipette is emptied.

* * * * *

UNITED STATES PATENT OFFICE
CERTIFICATE OF CORRECTION

Patent No. 3,810,391  Dated May 14, 1974

Inventor(s) OSMO A. SUOVANIEMI

It is certified that error appears in the above-identified patent and that said Letters Patent are hereby corrected as shown below:

IN THE CAPTION:

The Priority Data Information should be as follows:

--Finland Application No.1788/71 filed June 23, 1971--.

Signed and sealed this 10th day of September 1974.

(SEAL)
Attest:

McCOY M. GIBSON, JR.
Attesting Officer

C. MARSHALL DANN
Commissioner of Patents